United States Patent
Sato (10) Patent No.: US 12,094,027 B2
(45) Date of Patent: Sep. 17, 2024

(54) INFORMATION PROCESSING DEVICE, AND NON-TRANSITORY COMPUTER-READABLE RECORDING MEDIUM THEREFOR

(71) Applicant: Brother Kogyo Kabushiki Kaisha, Nagoya (JP)

(72) Inventor: Hirotaka Sato, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 187 days.

(21) Appl. No.: 17/645,800

(22) Filed: Dec. 23, 2021

(65) Prior Publication Data
US 2022/0215503 A1 Jul. 7, 2022

(30) Foreign Application Priority Data
Jan. 4, 2021 (JP) ................................ 2021-000249

(51) Int. Cl.
*G06T 1/20* (2006.01)
*G06F 9/48* (2006.01)
*G06T 1/60* (2006.01)

(52) U.S. Cl.
CPC ................ *G06T 1/20* (2013.01); *G06F 9/485* (2013.01); *G06T 1/60* (2013.01)

(58) Field of Classification Search
CPC ... G06T 1/20; G06T 1/60; G06F 9/485; G06F 11/3414; G06F 11/324
See application file for complete search history.

(56) References Cited

U.S. PATENT DOCUMENTS

| 10,282,690 B1* | 5/2019 | DelFranco | G06F 16/972 |
| 2009/0213407 A1* | 8/2009 | Kamiya | H04N 1/00222 358/1.15 |
| 2011/0055719 A1* | 3/2011 | Mori | G06F 3/0483 715/747 |
| 2013/0132940 A1* | 5/2013 | Meier | G06F 8/38 717/174 |
| 2017/0017430 A1* | 1/2017 | Mukasa | G06F 3/1203 |
| 2017/0185356 A1 | 6/2017 | Kawaguchi | |

(Continued)

FOREIGN PATENT DOCUMENTS

| JP | 2016-174229 A | 9/2016 |
| JP | 2017-117195 A | 6/2017 |

(Continued)

OTHER PUBLICATIONS

Japanese Office Action for the related Japanese Patent Application No. 2021-000249 dated Jul. 30, 2024.

*Primary Examiner* — James A Thompson
*Assistant Examiner* — Kim Thanh T Tran
(74) *Attorney, Agent, or Firm* — KENEALY VAIDYA LLP (57) ABSTRACT

An information processing device, when one or more pieces of workflow information defining settings and processes for the image processing device are stored in a particular storage area accessible by a computer and when workflow information satisfying a particular condition is included among the one or more pieces of workflow information stored in the particular storage area, performs reading the workflow information satisfying the particular condition from the particular storage area, and importing the read workflow information in a workflow information storage area in the memory.

12 Claims, 7 Drawing Sheets

(56) References Cited

U.S. PATENT DOCUMENTS

| | | |
|---|---|---|
| 2018/0359375 A1 | 12/2018 | Seo |
| 2019/0278630 A1 | 9/2019 | Kuroyanagi et al. |
| 2023/0195923 A1* | 6/2023 | Takada .................... G06F 21/31 726/26 |

FOREIGN PATENT DOCUMENTS

| | | |
|---|---|---|
| JP | 2018-206201 A | 12/2018 |
| JP | 2018-159421 A | 9/2019 |

* cited by examiner

| | ICON | WORKFLOW | PRODUCT NAME |
|---|---|---|---|
| ☐ | | WFA | ADS-A 11.22.33.01 |
| ☐ | | WFB | ADS-A 11.22.33.01 |
| ☐ | | WFC | ADS-A 11.22.33.01 |
| ☑ | | WFD | MFP-A 11.22.33.44 |
| ☐ | | WFE | MFP-A 11.22.33.44 |

APPLICATION SETTINGS

HELP
ACCOUNT SETTINGS — 222a5
WORKFLOW MANAGEMENT
PRODUCT INFORMATION
SCAN SETTINGS FROM MAIN BODY

EDIT | DELETE | OPTION SETTINGS | EXPORT 222a
222a2
222a1

INFORMATION PROCESSING DEVICE, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2021-000249 filed on Jan. 4, 2021. The entire subject matter of the application is incorporated herein by reference.

BACKGROUND

The present disclosures relate to a technology for importing workflow information.

There has been known a control program that stores workflow information associated with devices, and when a device is selected, displays the workflow information associated with the selected device.

SUMMARY

According to such a program, however, the workflow information is created in an information processing device that is configured to store and execute the workflow information, and importing workflow information created outside the information processing device into that device to use the same is not considered.

According to aspects of the present disclosure, a non-transitory computer-readable recording medium for an information processing device provided with a communication interface, a memory and a computer, and is connected to one or more image processing devices through the communication interface. When one or more pieces of workflow information defining settings and processes for the image processing device are stored in a particular storage area accessible by the computer and when workflow information satisfying a particular condition is included among the one or more pieces of workflow information stored in the particular storage area, the non-transitory computer-readable recording medium storing computer-executable instructions can cause, when executed by the computer, the information processing device to perform reading the workflow information satisfying the particular condition from the particular storage area, and importing the read workflow information in a workflow information storage area in the memory.

DESCRIPTION OF THE EMBODIMENTS

Referring to the accompanying drawings, an embodiment according to the present disclosures will be described in detail.

Figure 1:
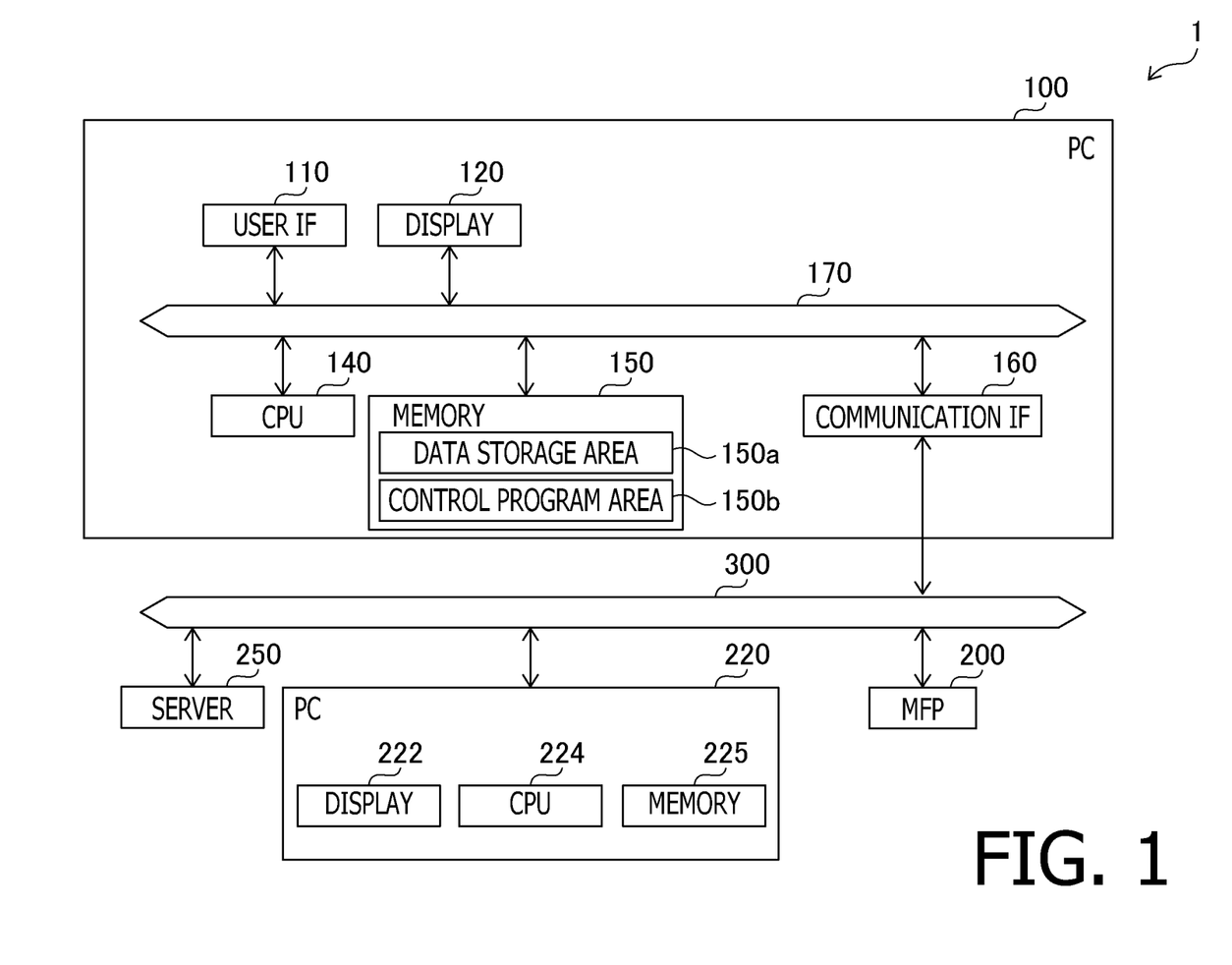
FIG. 1 is a block diagram of a control configuration of an image processing system according to the present disclosures.

FIG. 1 shows a control configuration of an image processing system 1 according to an embodiment of the present disclosures. The image processing system 1 has a PC 100 (an example of an "information processing device"), an MFP 200, a PC 220, and a server 250. The initialism "MFP" is an abbreviation for a multifunction peripheral.

The MFP 200 is a multifunctional peripheral having at least printing and scanning functions, and in some models, a facsimile function as well.

The PC 100 is equipped with a user IF 110, a display 120, a CPU 140 (an example of a "computer"), a memory 150 and a communication IF 160. The user IF 110, the display 120, the CPU 140, the memory 150, and the communication IF 160 are connected to each other via a bus 170. It is noted that the "IF" is an abbreviation for an interface.

The user IF 110 is typically provided with a keyboard and a mouse.

The display 120 includes a display device, such as a liquid crystal display or an organic EL display, and a drive circuit configured to drive the display device. When a touch panel type display is used as the display 120, the user can perform input operations by touching the input buttons displayed on the screen. In such a case, therefore, the display 120 also serves as the user IF 110.

The CPU 140 executes various application programs (hereinafter referred to as "applications") including information processing programs (an example of "programs"), firmware, and the like.

The memory 150 includes a ROM, a RAM, an HDD, an SSD, and optical disk drive. A data storage area 150a of the memory 150 is an area for storing data necessary for the CPU 140 to execute information processing programs and the like. A control program area 150b of the memory 150 is an area for storing an OS, information processing program, and various other applications and firmware.

The memory 150 may be a computer-readable storage medium. A computer-readable storage medium is a non-transitory medium, which includes recording media such as CD-ROMs and DVD-ROMs, in addition to the examples above. A non-transitory medium is also a tangible medium. On the other hand, electrical signals carrying programs downloaded from servers on the Internet, or the like, are computer-readable signal media, which is a type of computer-readable media, but are not included in the non-transitory computer-readable storage media.

In this description, a process of the CPU 140 according to instructions described in the program will be indicated basically. In other words, processes of "determination," "extraction," "selection," "calculation," "decision," "identification," "acquisition," "reception," "control," "setting," and the like in the following description represent the processes of the CPU 140. The processes executed by the CPU 140 include hardware control via the OS. In addition, "acquisition" is used in a concept that does not require a request. In other words, the process of receiving data without a request by the CPU 140 is also included in the concept of "acquisition of data by the CPU 140. Further, "data" in this specification is represented by a computer-readable bit string. It is noted that data with the same substantive meaning content but different formats will be treated as the same data. The same applies to "information" in this specification. In addition, processes of "command," "response," "request," and the like is performed by communicating information indicating "command," "response," "request," and the like. The words "instruction," "response," "request,"

and the like may be described in the sense of the information itself indicating the "instruction," "response," "request," and the like.

Various applications, including information processing programs, can be downloaded from the server 250 via the communication IF 160.

The communication IF 160 is configured to connect the PC 100 to the communication network 300. In the present embodiment, the MFP 200, the PC 220, and the server 250 are connected to the communication network 300. Therefore, the communication IF 160 is capable of communicating with the MFP 200, the PC 220, and the server 250 via the communication network 300. The communication network 300 may be a network of various forms. For example, the communication network 300 may be a wired or wireless LAN, WAN, USB, Bluetooth (registered trademark), NFC network, or the like.

In addition to the function of supplying various applications including information processing programs as described above, the server 250 also has, according to the present embodiment, a function of storing a workflow file (an example of "workflow information") and supplying the same in response to a request from the PC 100. The workflow is, in the present embodiment, information that specifies various settings and various processes for various image processing devices including the MFP 200, and it is possible to apply the specified various settings and various processes to the target image processing device by an extremely simple user operation, for example, just by clicking a WFa icon 132c or a WFD icon 132d (see FIG. 6) described below. In the present embodiment, the workflow is assumed to specify a target image processing device and execute various settings and various processes on the target image processing device, and accordingly, a workflow is associated with the target image processing device. Any method of association can be used to associate the workflow with the target image processing device. For example, model name identification information (an example of "device identification information") that identifies the target image processing device by its model name may be included in the workflow or such information may be attached to the workflow. In the present embodiment, a method of associating a workflow with the target image processing device by including the model name identification information in the workflow.

The workflow file is stored in a particular area in a storage device of the server 250, that is, for example, in a workflow storage folder (which is an example of a "particular storage area," and hereinafter referred to as a "server-side workflow storage folder"). Therefore, when the PC 100 downloads a workflow file from the server 250, the PC 100 downloads the workflow file stored in the server-side workflow storage folder. It is noted that the workflows can be created and/or edited by users, on the PC 100 as is done conventionally, but the workflow file stored in the server 250 can be created and edited only by an operator with a particular authority, for example, administrator authority (hereinafter referred to as "administrator"), and a user of the PC 100 who does not have the administrator authority cannot create and/or edit the workflow. In addition, a workflow created and edited by the user within the PC 100 can be freely edited by the user of PC 100 within PC 100, but a workflow file downloaded from the server 250 into the PC 100 cannot be freely edited by the user of the PC 100 within the PC 100 even after downloaded into the PC 100. Such a configuration is, however, only an example, and the configuration may be modified such that the user of the PC 100 can freely edit the same within the PC 100 after downloading.

Further, the server 250 also has a function of storing external files and supplying them to the PC 100 in response to requests from the PC 100. The information processing program is, according to the present embodiment, a program that performs various controls on various image processing devices including the MFP 200, and the external file is, in the present embodiment, a file that describes default values of various setting items used by the information processing program in performing various controls on the MFP 200. The external file, as well as the workflow file stored in the server 250, can be created and/or edited only by the administrator, and is placed in a particular folder on a storage device of the server 250, and a particular file name is assigned to the external file.

It is noted that, the "workflow file" means a file that contains therein information of a "workflow," but, in the following description, in some cases, it is difficult to strictly distinguish between the "workflow file" and "workflow." In such cases, the "workflow file" may be described as the "workflow" or vice versa.

The PC 220 is a PC used by the administrator. Therefore, the workflow created in the PC 220 can be uploaded to the server-side workflow storage folder. The control configuration of the PC 220 is the same as that of PC100, but only a display 222, a CPU 224, and a memory 225 are shown in FIG. 1 for convenience of explanation.

Figure 2:
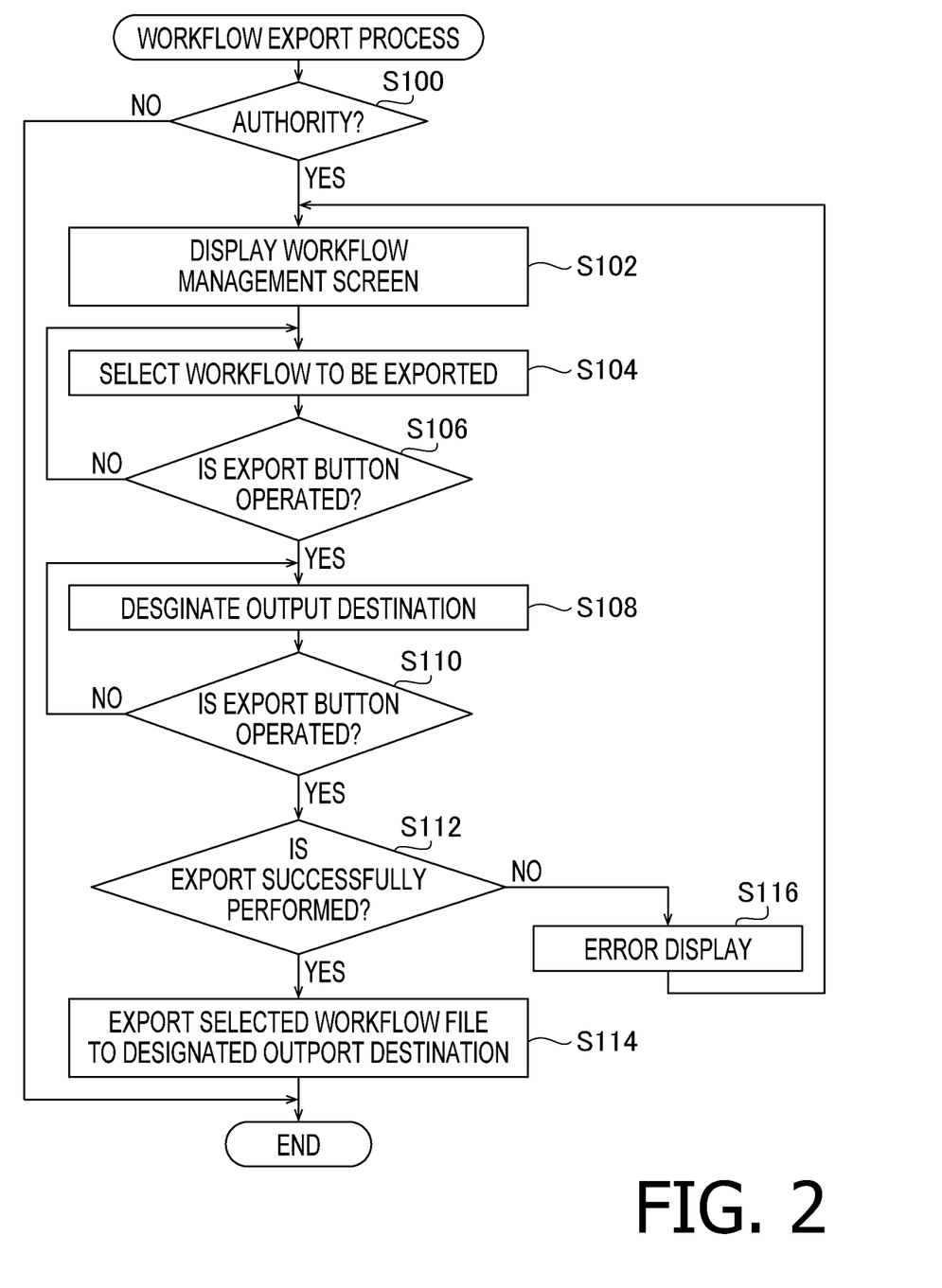
FIG. 2 is a flowchart illustrating a workflow export process.

FIG. 2 is a flowchart illustrating a workflow export process to be executed by the PC 220, in particular by the CPU 224. The workflow export process is initiated when, for example, an operator of the PC 220 performs an operation, on the display 222, to instruct the execution of an application setting. It is noted that, "workflow export" means uploading of the workflow file created in the PC 220 to the server-side workflow storage folder of the server 250. Hereinafter, in the description of each process, "step" is denoted by "S."

In FIG. 2, the CPU 224 first determines whether the operator is an administrator or not (S100). In this determination, when the operator is not an administrator (S100: NO), the CPU 224 terminates the workflow export process. On the other hand, when the operator is determined to be an administrator (S100: YES), the CPU 224 displays a workflow management screen on the display 222 (S102).

Figure 3A:
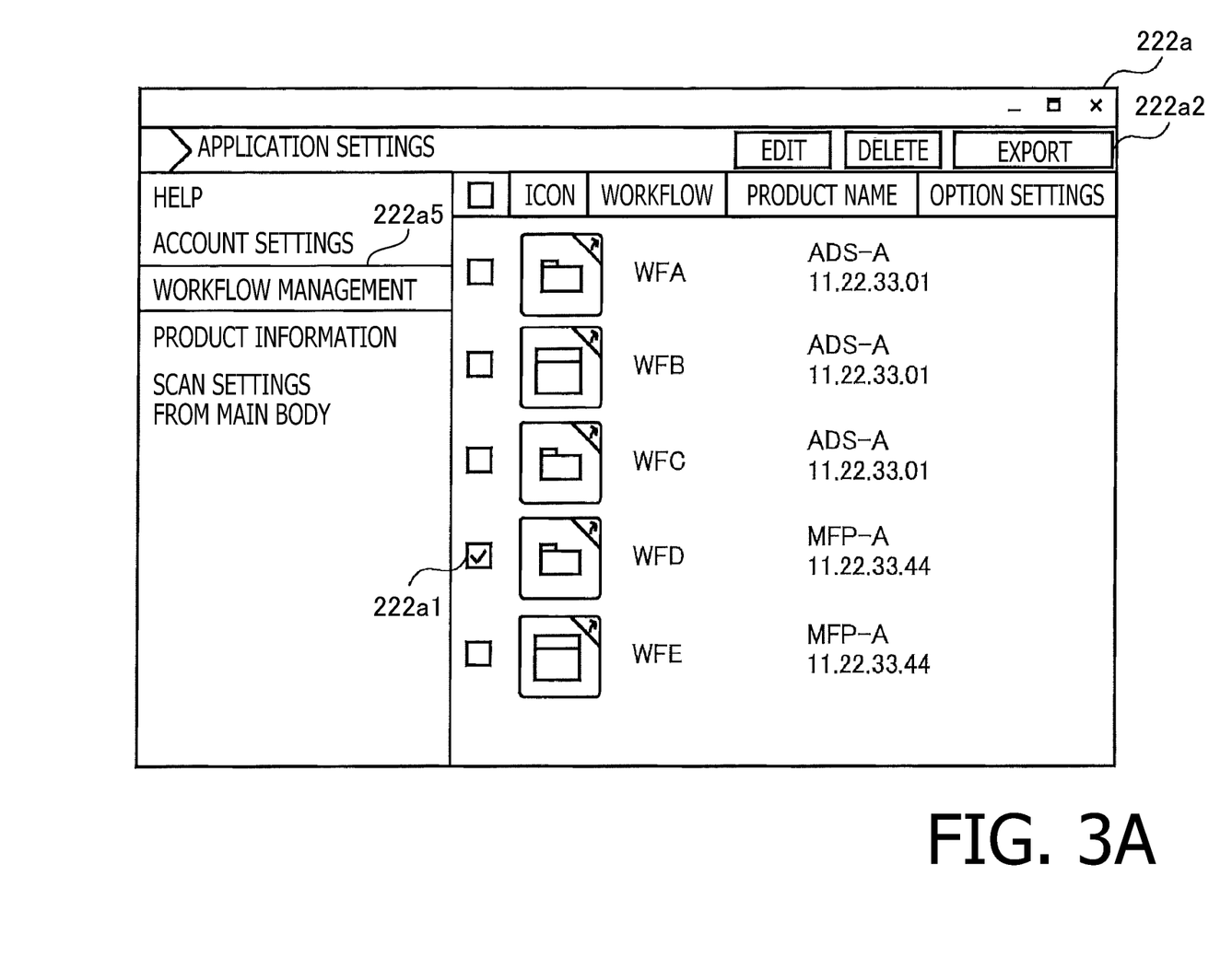
FIGS. 3A and 3B show examples of screens displayed in the workflow export process.

FIG. 3A shows a workflow management screen 222a displayed on the display 222. Since the workflow management screen 222a is the screen when a "Workflow Management" tab 222a5 is selected as shown in FIG. 3A, the administrator has performed the operation of selecting the "Workflow Management" tab 222a5 before the process advances to S102. The workflow management screen 222a shows a plurality of workflows created in the PC 220, together with icons, workflow names and product names (model names), and the like. The workflow to be exported is indicated by placing a check mark in the check box displayed to the left of the icon. In the example shown in FIG. 3A, a check box 222a1 for the workflow of which workflow name is "WFD" (hereinafter referred to as "workflow WFD") is marked with the check mark, thus the workflow WFD is the export target. When an "export" button 222a2 is operated, the workflow management screen 222a transitions to a workflow export screen 222b shown in FIG. 3B.

Returning to FIG. 2, the CPU 224 selects a workflow to be exported according to a user operation, i.e., an operation to put the check mark in a check box (S104). Then, the CPU 224 continues the selection process of S104 until the "export" button 222a2 is operated (S106: NO). When the "export" button 222a2 is operated (S106: YES), the CPU 224 advances the process to S108. At this time, the workflow export screen 222b of FIG. 3B is displayed on the display 222.

Figure 3B:
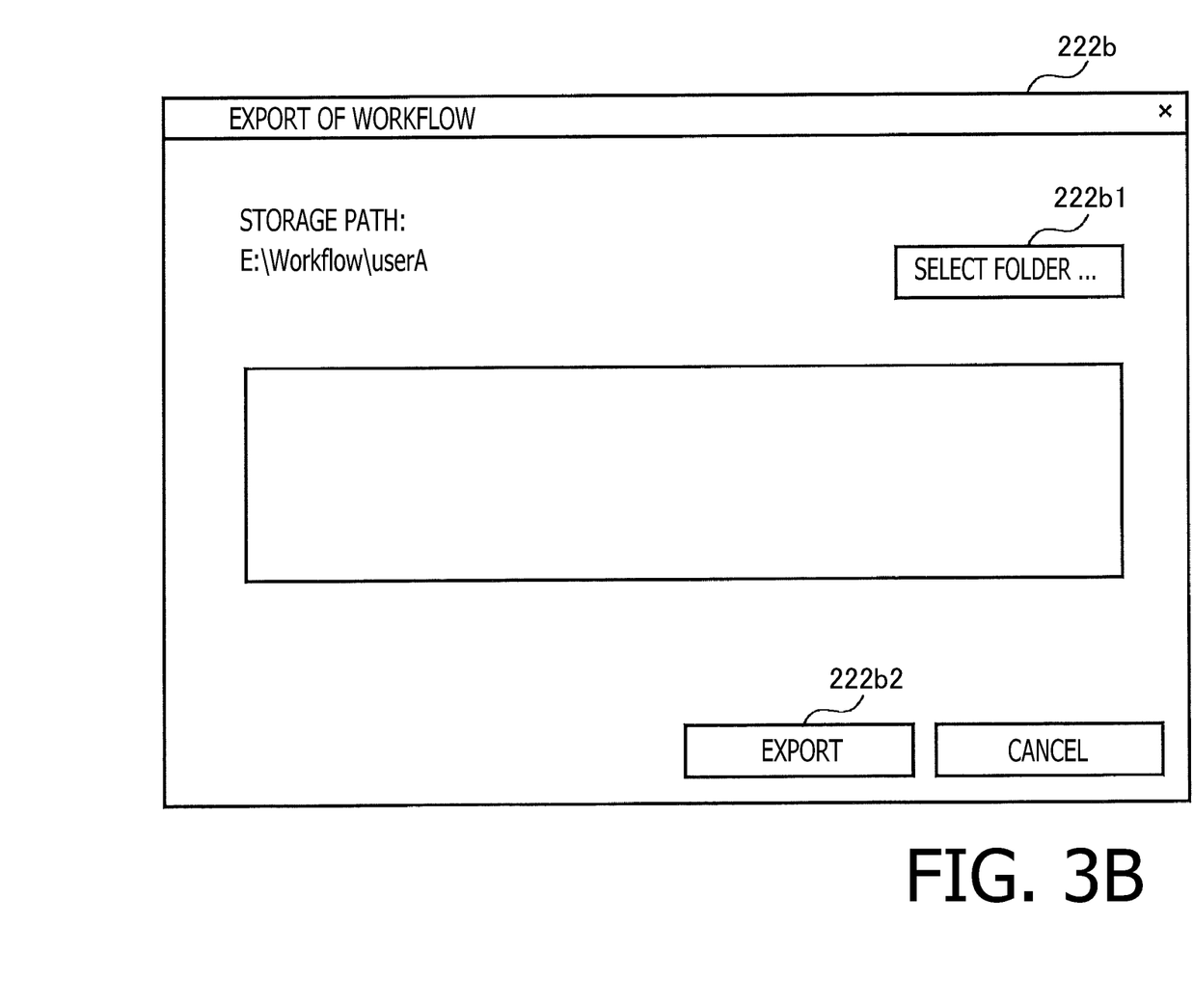

As shown in FIG. 3B, a "select folder" button 222b1 and the "export" button 222b2 are displayed on the workflow export screen 222b. The "select folder" button 222b1 is used to select a folder to which the workflow file selected on the workflow management screen 222a is to be exported. When the "select folder" button 222b1 is operated, for example, a folder selection screen (not shown) for selecting a folder pops up, and the administrator can select a folder from the folder selection screen to which folder the workflow file is to be exported. In the present embodiment, the administrator selects the server-side workflow storage folder because the folder to which the workflow file is to be exported is the server-side workflow storage folder of the server 250 as described above. In the present embodiment, "E:\Workflow\userA" is used as the folder path of the server-side workflow storage folder, so the path is displayed as the storage location in the workflow export screen 222b. On the other hand, the "export" button 222b2 displays the path to the saved location. On the other hand, the "export" button 222b2 is a button for instructing the export of the selected workflow file to the selected folder.

Returning to FIG. 2, the CPU 224 specifies the output destination (i.e., the export destination) according to the user operation on the workflow export screen 222b (i.e., the click operation of the "select folder" button 222b1) and the input operation on the folder selection screen that pops up accordingly (S 108). Then, the CPU 224 continues the designation process of S108 until (S 110: NO) the "export" button 222b2 is operated When the "export" button 222b2 is operated (S 110: YES), the CPU 224 advances the process to S 112.

In S112, the CPU 224 determines whether the export is successful or not. In this determination, when the export is successful (S112: YES), the CPU 224 exports (S114) the file of the workflow selected in S104 to the output destination specified in S108 above, and then terminates the workflow export process. On the other hand, when the export fails (S112: NO), the CPU 224 displays an error display including a message informing that the export has failed on the display 222 (S116), then returns the process to S102 above and causes the process from S102 to be executed again.

In this way, according to the workflow export process, it is possible to export the selected workflow file which is selected from among the workflows created in the PC220 to the server-side workflow storage folder.

Figure 4:
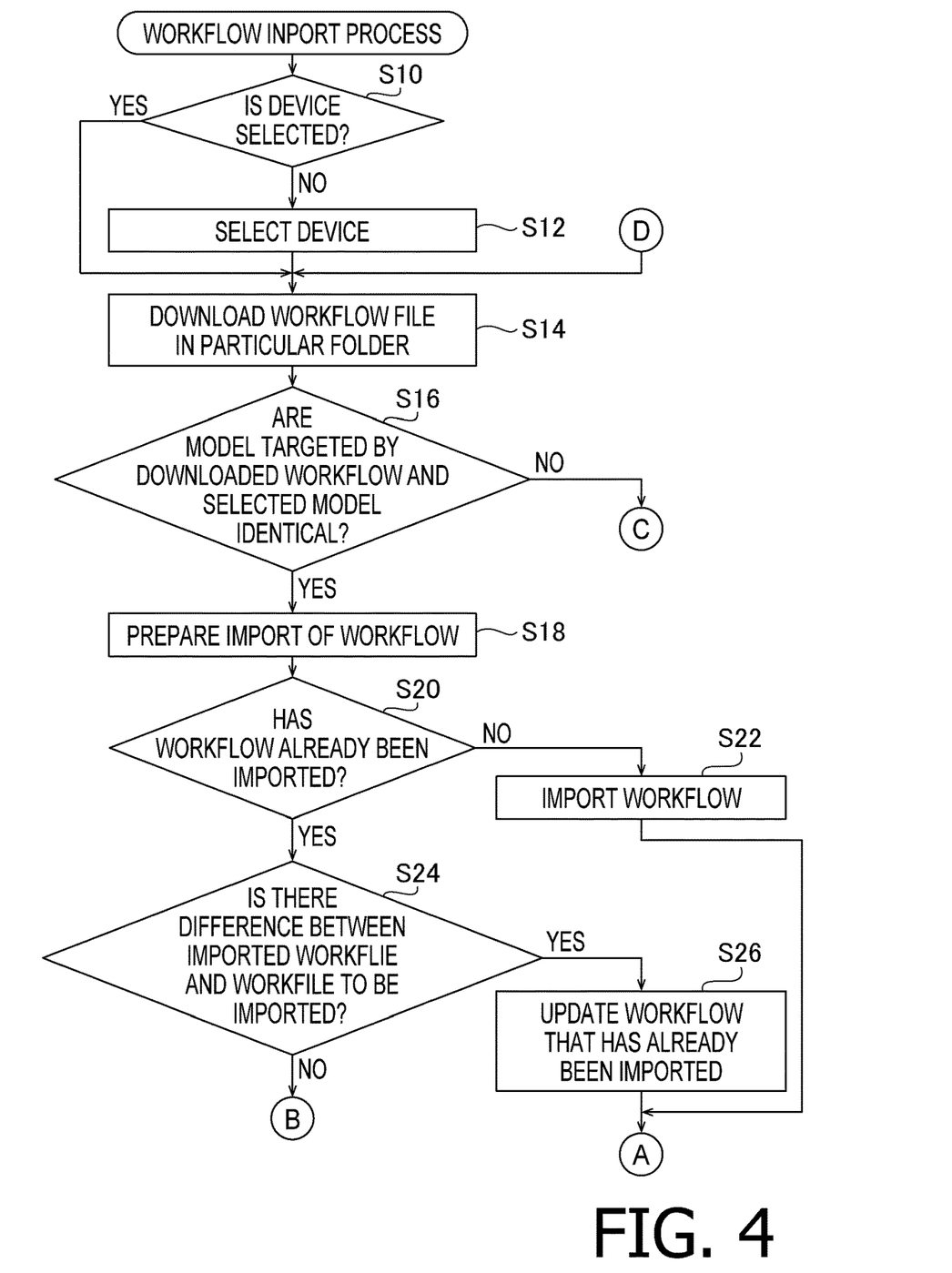
FIGS. 4 and 5 show a flowchart illustrating a workflow import process.
Figure 5:
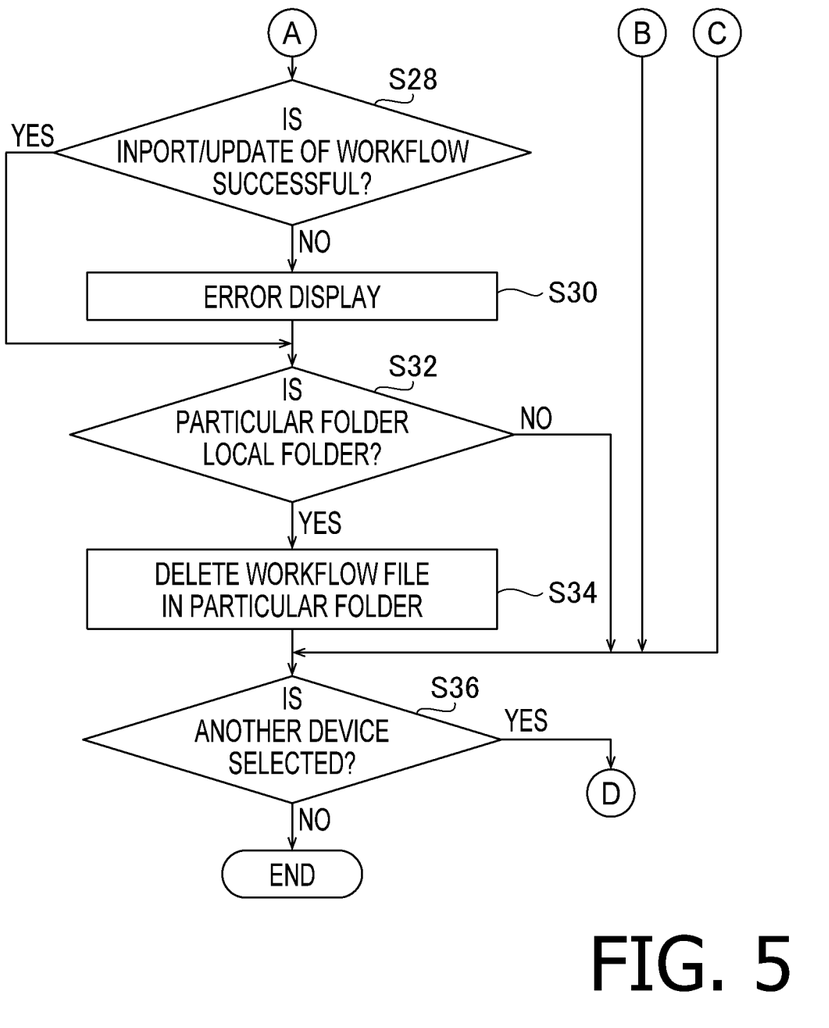

FIGS. 4 and 5 show a flowchart illustrating the workflow import process executed by the PC 100, in particular, by the CPU 140. The workflow import process is included in the information processing program. When the information processing program is started, the CPU 140 accesses the server 250 at a particular timing and downloads the above external file from the server 250. The external file contains the folder path of the server-side workflow storage folder when there is a workflow to be imported. Thus, when the folder path of the server-side workflow storage folder is described in the downloaded external file, the CPU 140 starts the workflow import process. The particular timing may be a timing immediately after starting the information processing program. Further, the particular timing may be a timing when an initial screen (hereinafter referred to as a "home screen") is about to be displayed while the information processing program is being executed.

In FIG. 4, the CPU 140 first determines whether a device has been selected (S10). In this determination, when no device has been selected (S10: NO), the CPU 140 prompts the user to select a device. When the user designates a device to be selected, the CPU 140 selects the device as instructed (S12), and then advances the process to S14. On the other hand, when the device has already been selected (S10: YES), the CPU 140 skips S12 and advances the process to S14.

Figure 6:
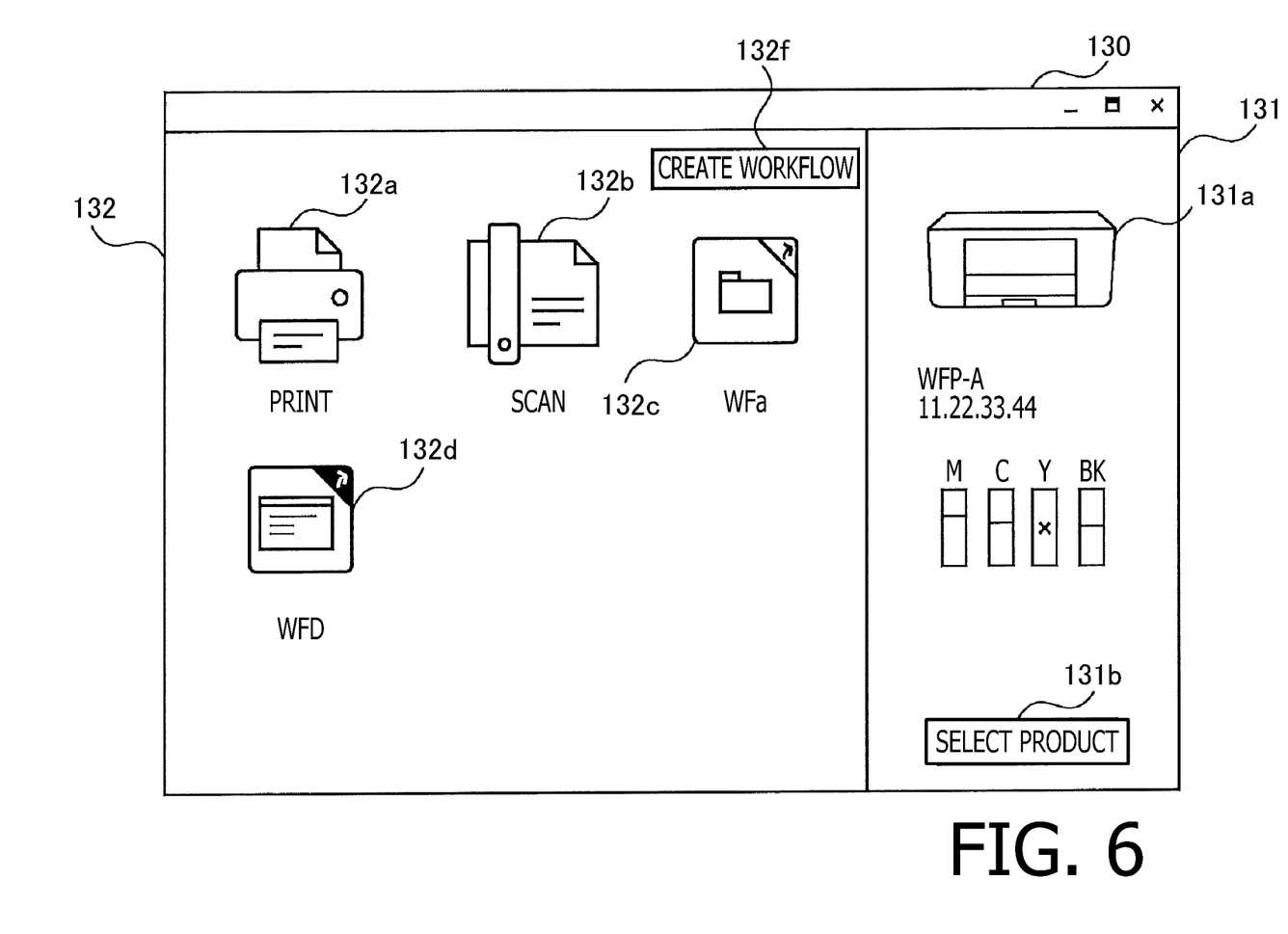
FIG. 6 shows an example of a screen displayed after the workflow import process is executed.

FIG. 6 shows an example of the home screen 130 displayed on the display 120 as the CPU 140 executes the information processing program. It is noted that the home screen 130 shows the state after the above workflow WFD has been imported in the workflow import process. Therefore, when the workflow import process is started for the first time, since the above workflow WFD has not yet been imported, the WFD icon 132d, which instructs the execution of the workflow WFD, is not displayed on the home screen, while the WFa icon 132c is displayed on the home screen. It is because the WFa icon 132c is an icon for instructing the execution of a workflow named "WFa" (hereinafter referred to as the "workflow WFa"), and the workflow WFa is a workflow created by the user in PC 100 as described above.

As shown in FIG. 6, the home screen 130 has a selected device display area 131 where a selected devices to be controlled are displayed. In the selected device display area 131 shown in FIG. 6, the MFP 200 that has already been selected as the control target is displayed with an icon 131a. The MFP 200 is an MFP with the model name "MFP-A" and the IP address "11.22.33.44." The "select product" button 131b is a button to be operated when no device to be controlled is selected, or when the currently selected device is to be changed to another device. When the "select product" button 131b is operated, image processing devices connected to the communication network 300 are listed, and any of them can be selected as the device to be controlled.

The home screen 130 has a function list area 132. The function list area 132 is an area that lists the functions of the device displayed in the selected device display area 131. Since the device with the model name "MFP-A" is a multifunction peripheral equipped with a print function and a scan function, the function list area 132 displays a print icon 132a indicating the print function and a scan icon 132b indicating the scan function. In addition, the above-described WFa icon 132c and the above-described WFD icon 132d are also displayed in the function list area 132. It is noted that the WFD icon 132d is not displayed in the function list area 132 at the time when the workflow import process is first started and the process proceeds to S14, as described above. In addition to the icons 132a through 132d, a "create workflow" button 132f is also displayed in the function list area 132. The "create workflow" button 132f is a button that is operated when the user creates a workflow in the PC100, as in the workflow WFa above. When the "create workflow" button 132f is operated, the CPU 140 displays a workflow creation screen (not shown) on the display 120. When the user creates the workflow on the workflow creation screen and instructs to store the workflow, the CPU 140 stores the file of the created workflow in a particular area on the memory 150, for example, in a workflow storage folder (an example of a "workflow information storage area" and hereinafter referred to as a "PC-side workflow storage folder").

Returning to FIG. 4, in S14, the CPU 140 downloads the workflow file stored in a specific folder of the server 250, i.e., the above server-side workflow storage folder, to the temporary storage area of the memory 150. When the process advances to S14, the external file contains the folder path of the above server-side workflow storage folder. Therefore, in S14, the CPU 140 downloads the workflow file existing in the folder indicated by the folder path to the temporary storage area of the memory 150.

Next, the CPU 140 determines whether the model name indicated by the above model name identifying information contained in the workflow file downloaded to the temporary storage area of the memory 150 is the same as the model name of the device currently being selected (S16). In this determination, when the model name indicated by the model name identifying information and the model name of the currently selected device are different (S16: NO), the CPU 140 advances the process to S36 (FIG. 5). On the other hand, when the model name indicated by the model name identifying information and the model name of the currently selected device are the same (S16: YES), the CPU 140 advances the process to S18. Where there are multiple downloaded workflow files, the CPU 140 determines whether any of the model names indicated by the model name identifying information contained in each workflow file is the same as the model name of the currently selected device. When there is no identical model name, the workflow import process is terminated. On the other hand, when there is an identical model name, the process advances to S18. In some cases, there may be multiple identical model names. In such a case, the CPU 140 should perform the process from S18 onward for each of the multiple workflow files.

In S18, the CPU 140 prepares to import the downloaded workflow file, that is, prepares to store the same in a particular area on the memory 150, for example, the PC-side workflow storage folder described above. Then, the CPU 140 determines whether a workflow file having the same model name identifying information as the workflow file being prepared for import has already been imported in the PC-side workflow storage (S20). When, in this determination, the workflow file has not yet been imported (S20: NO), the CPU 140 executes import of the workflow file for which import is being prepared, and then advances the process to S28 (FIG. 5). FIG. 6 shows the home screen 130 after the execution of the workflow import process as described above. In the function list area 132 of the home screen 130, a WFD icon 132d is displayed to instruct the execution of the imported Workflow WFD. The WFD icon 132d is displayed in a different manner from the WFa icon 132c for workflows created in the PC 100 so that it is clear that the WFD icon 132d is an icon for an imported workflow.

On the other hand, in the determination of S20, when the workflow file has already been imported (S20: YES), the CPU 140 determines whether there is a difference between the workflow file that has already been imported and the workflow file that is being prepared for import (S24). In this determination, when it is determined that there is no difference (S24: NO), the CPU 140 advances the process to S36 (FIG. 5). On the other hand, when it is determined that there is a difference (S24: YES), the CPU 140 updates the workflow file that has already been imported with the workflow file that is being prepared for import (S26), and then advances the process to S28.

In S28, the CPU 140 determines whether the workflow file has been successfully imported/updated. In this determination, when the import/update of the workflow file has failed (S28: NO), the CPU 140 displays, on the display 120, an error display including a message informing that the import/update of the workflow file has failed (S30), and then advances the process to S32. On the other hand, when the workflow file is successfully imported/updated (S28: YES), the CPU 140 skips S30 and advances the process to S32.

In S32, the CPU 140 determines whether the specific folder, that is, the server-side WorkFlow storage folder, is a local folder. The local folder is not a folder shared by multiple people, but a folder used only by one particular person. In the determination in S32, when the server-side workflow storage folder is a local folder (S32: YES), the CPU 140 deletes the workflow file in the server-side workflow storage folder, that is, the imported workflow file (S34), and then advances the process to S36. The reason for deleting the imported workflow file in the server-side workflow storage folder in this way is that when the server-side workflow storage folder is a local folder, the imported workflow file cannot be imported by another user after it has been imported.

On the other hand, in the determination of S32, when the server-side workflow storage folder is not a local folder (S32: NO), the CPU 140 skips S34 and advances the process to S36. The reason why the imported workflow file in the server-side workflow storage folder is not deleted in this way is that when the server-side workflow storage folder is not a local folder, the imported workflow file may be imported by another user after importing.

In S36, the CPU 140 determines whether another device has been selected. In this determination, when another device has been selected (S36: YES), the CPU 140 returns the process to S14. On the other hand, when another device is not selected (S36: NO), the CPU 140 terminates the workflow import process.

Thus, according to the workflow import process, a workflow WFD file created outside of the PC 100 can be imported into the PC 100 and used.

Aspects of the present disclosures are not necessarily limited to the configuration of the above embodiment, but various changes can be made without departing from aspects of the present disclosures.

(1) In the above-described embodiment, only one MFP 200 is used as the image processing device connected to the PC 100, but multiple MFPs may be connected and any of them may be selected. In such a case, not only MFPs, but also stand-alone printers and scanners may be connected and selected.

(2) In the above-described embodiment, the workflow file to be imported into the PC 100 is placed on the storage device in the server 250, but it may also be placed on the memory 150 of the PC 100. In this case, the workflow file created by the administrator in the PC 220 can be directly stored in the memory 150 of the PC 100.

(3) In the above-described embodiment, the external file is stored on the storage device in the server 250, but it may also be stored on the memory 150 of the PC 100. In this case, the external file should be stored in a particular area on the memory 150 together with the information processing program when it is installed in the PC 100. Another possible method is for the user of the PC 100 to read the external file and store it in a particular area on the memory 150 after being given a USB memory or other device that stores the external file.

(4) In the above embodiment, a display format of the icon is differentiated so that the user can recognize that it is an imported workflow and that it is a workflow created in the PC 100. However, it is also possible to change the appearance of the icon name displayed below the icon without changing the appearance of the icon itself. In addition to changing the display format of the icon, the display format of the icon name may also be changed. In addition, any method of changing the display style, such as display color, pattern, shape, font, and the like may be used.

What is claimed is:

1. A non-transitory computer-readable recording medium for an information processing device provided with a communication interface, a memory and a computer, and is connected to one or more image processing devices through the communication interface,
wherein, when one or more pieces of workflow information defining settings and processes for the one or more image processing devices are stored in a particular storage area accessible by the computer and when workflow information satisfying a particular condition is included among the one or more pieces of workflow information stored in the particular storage area, the non-transitory computer-readable recording medium storing computer-executable instructions which cause, when executed by the computer, the information processing device to perform:
reading the workflow information satisfying the particular condition from the particular storage area; and
importing the read workflow information in a workflow information storage area in the memory,
wherein the instructions cause, when executed by the computer, to further perform selecting an image processing device from among the one or more image processing devices,
wherein the workflow information is associated with first device identifying information identifying a target image processing device that is a target of the settings and the processes, and
wherein the workflow information satisfying the particular condition is workflow information to which a second device identifying information is the same as the first device identifying information associated with the image processing device selected in the selecting.

2. The non-transitory computer-readable recording medium according to claim 1,
wherein the workflow information stored in the particular storage area is generated by a user having a particular authority.

3. The non-transitory computer-readable recording medium according to claim 1,
wherein the first device identifying information includes a model name of the image processing device.

4. The non-transitory computer-readable recording medium according to claim 1,
wherein, when an other image processing device is selected in the selecting, workflow information associated with the first device identifying information that is the same as the second device identifying information associated with the selected other image processing device is imported in the importing.

5. The non-transitory computer-readable recording medium according to claim 1,
wherein the instructions cause, when executed by the computer, the information processing device to further perform first determining whether workflow information same as the workflow information to be imported in the importing has already been stored in the workflow storage area of the memory,
wherein, when it is determined that no workflow information same as the workflow information to be imported in the importing has already been stored in the workflow storage area of the memory, importing the read workflow information in the importing.

6. The non-transitory computer-readable recording medium according to claim 5,
wherein, the instructions cause, when executed by the computer, the information processing device to further perform:
when it is determined in the first determining that workflow information same as the workflow information to be imported in the importing has already been stored in the workflow storage area of the memory, second determining whether there is a difference between a content of the workflow information to be imported and a content of the stored workflow information; and
when it is determined in the second determining that there is a difference between a content of workflow information to be imported and a content of the stored workflow information, importing the read workflow information.

7. The non-transitory computer-readable recording medium according to claim 1,
wherein, the instructions cause, when executed by the computer, the information processing device to further perform deleting the workflow information imported in the importing from the particular storage area.

8. The non-transitory computer-readable recording medium according to claim 7,
wherein the deleting is performed when the particular storage area is not shared by multiple users.

9. The non-transitory computer-readable recording medium according to claim 1,
wherein the workflow storage area of the memory stores the workflow information imported in the importing and the workflow information generated in the image processing device, and
wherein editing of the imported workflow information is prohibited, and editing of the generated workflow information is allowed.

10. The non-transitory computer-readable recording medium according to claim 9,
wherein the information processing device further provided with a display,
wherein the instructions cause, when executed by the computer, the information processing device to further perform displaying information indicating the workflow information stored in the workflow information storage area of the memory, a display format of the imported workflow information being differentiated from a display format of the created workflow information.

11. An information processing device, comprising:
a communication interface;
a memory; and
a controller,
wherein the information processing device is connected to one or more image processing devices through the communication interface, and
wherein the controller is configured such that when one or more pieces of workflow information defining settings and processes for the one or more image processing devices are stored in a particular storage area accessible by the computer and when workflow information satisfying a particular condition is included among the one or more pieces of workflow information stored in the particular storage area, the controller perform reading the workflow information satisfying the particular condition from the particular storage area and importing the read workflow information in a workflow information storage area in the memory, wherein the instructions cause, when executed by the computer, to further perform selecting an image processing device from among the one or more image processing devices, wherein the workflow information is associated with first device identifying information identifying a target image processing device that is a target of the settings and the processes, and wherein the workflow information satisfying the particular condition is workflow information to which a second device identifying information is the same as the first device identifying information associated with the image processing device selected in the selecting.

12. A non-transitory computer-readable recording medium for an information processing device provided with a communication interface, a memory and a computer, and is connected to one or more image processing devices through the communication interface, wherein, when one or more pieces of workflow information defining settings and processes for the one or more image processing devices are stored in a particular storage area accessible by the computer and when workflow information satisfying a particular condition is included among the one or more pieces of workflow information stored in the particular storage area, the non-transitory computer-readable recording medium storing computer-executable instructions which cause, when executed by the computer, the information processing device to perform:

reading the workflow information satisfying the particular condition from the particular storage area; and importing the read workflow information in a workflow information storage area in the memory, wherein the instructions cause, when executed by the computer, the information processing device to further perform first determining whether workflow information same as the workflow information to be imported in the importing has already been stored in the workflow storage area of the memory, wherein, when it is determined that no workflow information same as the workflow information to be imported in the importing has already been stored in the workflow storage area of the memory, importing the read workflow information in the importing, wherein, the instructions cause, when executed by the computer, the information processing device to further perform:

when it is determined in the first determining that workflow information same as the workflow information to be imported in the importing has already been stored in the workflow storage area of the memory, second determining whether there is a difference between a content of the workflow information to be imported and a content of the stored workflow information; and when it is determined in the second determining that there is a difference between a content of workflow information to be imported and a content of the stored workflow information, importing the read workflow information.

* * * * *